United States Patent
Kawachi et al.

(10) Patent No.: US 6,396,652 B1
(45) Date of Patent: May 28, 2002

(54) APPARATUS AND METHOD FOR CONTROL HEAD UNLOADING ON POWER DOWN IN A DISK DRIVE

(75) Inventors: Hidetoshi Kawachi, Nishitama-gun; Koji Osafune, Ome, both of (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/371,634

(22) Filed: Aug. 11, 1999

(30) Foreign Application Priority Data

Aug. 12, 1998 (JP) .......................................... 10-228049
Feb. 26, 1999 (JP) .......................................... 11-050274

(51) Int. Cl.⁷ .......................... G11B 21/02; G11B 15/46
(52) U.S. Cl. ...................................... 360/75; 360/73.03
(58) Field of Search ............................... 360/75, 73.03, 360/78.04; 318/254, 245, 439, 456

(56) References Cited

U.S. PATENT DOCUMENTS

| | | | |
|---|---|---|---|
| 5,600,219 A | | 2/1997 | Gomez ........................ 318/456 |
| 5,883,479 A | * | 3/1999 | Menegoli et al. ........... 318/254 |
| 6,025,968 A | * | 2/2000 | Albrecht ....................... 360/75 |
| 6,064,539 A | * | 5/2000 | Null et al. ..................... 360/75 |
| 6,229,663 B1 | * | 5/2001 | Yoneda et al. ................ 360/75 |

FOREIGN PATENT DOCUMENTS

| | | | |
|---|---|---|---|
| JP | 4-337579 | 11/1992 | ........... G11B/21/12 |
| JP | 9-231702 | 9/1997 | ........... G11B/21/12 |
| JP | 9-282821 | 10/1997 | ........... G11B/21/12 |

\* cited by examiner

Primary Examiner—Regina Y. Neal
(74) Attorney, Agent, or Firm—Gray Cary Ware & Freidenrich LLP

(57) ABSTRACT

Disclosed is a head loading/unloading type disk drive of retracting a head to a ramp by a reserve power supply upon power down of a main power supply. An unloading control system drives a VCM using a low-level voltage from the reserve power supply until the head reaches the ramp immediately upon power down of the main power supply. After the head reaches the ramp, the system applies a high-level voltage from the reserve power supply. The reserve power supply is made up of a rectifier for converting the back EMF of an SPM into a DC voltage. When a retract circuit detects power down of the main power supply, the DC voltage from the rectifier is limited to a low-level constant voltage by a constant voltage circuit, and applied to the VCM. When a ramp collision determining circuit determines collision of the head against the ramp, it controls the voltage applied to the VCM from the low-level voltage to a high-level voltage.

2 Claims, 13 Drawing Sheets

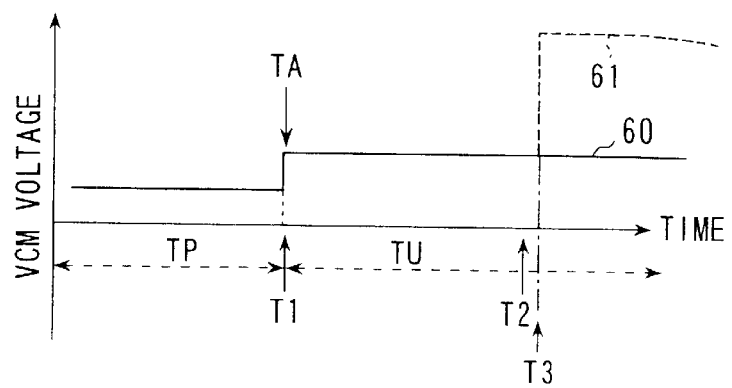
FIG. 6
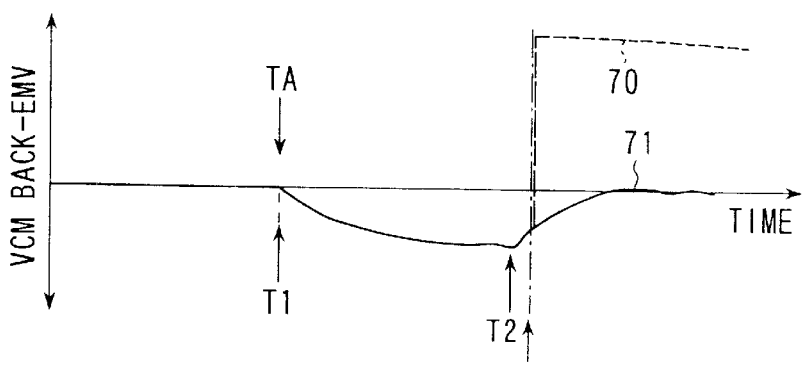
FIG. 7A
FIG. 7B
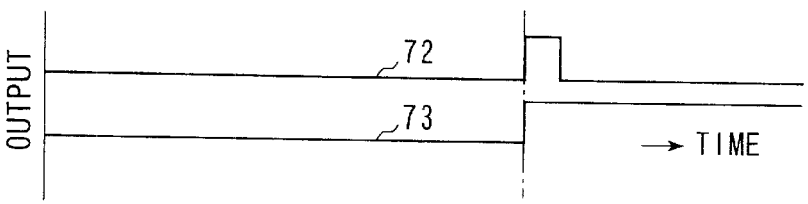
FIG. 7C
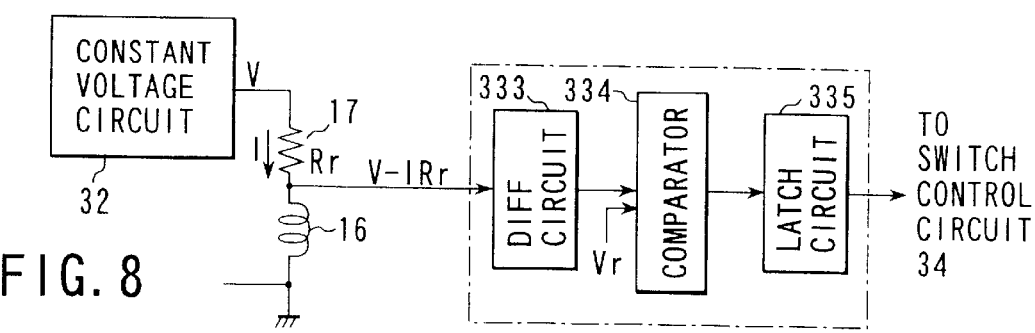
FIG. 8

APPARATUS AND METHOD FOR CONTROL HEAD UNLOADING ON POWER DOWN IN A DISK DRIVE

BACKGROUND OF THE INVENTION

The present invention relates to an apparatus and method applied to a head loading/unloading type disk drive to control unloading operation of retracting a head upon power down of the main power supply of a drive.

A hard disk drive (HDD) comprises a mechanism of retracting a head (slider on which a read/write element is mounted) to a designated retract position when a disk stops rotating, and a data read/write is disabled.

A CSS (Contact Start and Stop) type disk drive uses, as a retract position, a CSS area set on the innermost side on the disk, and retracts the head to the CSS area. When the disk stops rotating, the head comes into contact with the disk surface and is standby in contact with the CSS area. In the CSS type drive, the head slides on the disk surface at the rotation start and stop of the disk, and may damage (scratch) a data area on the disk.

To avoid this, the CSS area is set in a dedicated retract zone (to be also referred to as a dedicated landing zone) ensured separately from the data zone. When the drive is powered to rotate the disk by a spindle motor at a constant high speed, the head floats on the disk surface by air bearing generated with the rotation. Then, the head is moved to the data zone on the disk and positioned at a target position (target access track).

If the drive is powered down, or a host system issues a spindle motor stop instruction while the head is in the data zone, the drive retracts the head to the CSS area and stops the spindle motor. When the head retracts to the CSS area, the actuator collides against the stopper to prevent the head from projecting from the CSS area. The head is mounted on the actuator and moves radially along the disk by the driving force of a voice coil motor (VCM). The VCM drives the actuator by a driving current supplied from a VCM driver under the control of the microprocessor (CPU) of the drive.

When the drive is suddenly powered down during operation of the disk drive, the head must retract to the CSS area before the spindle motor stops. That is, if the disk stops rotating while the head floats on the data zone of the disk, the head collides against the disk. However, if power supply to the drive stops, supply of the driving current from the VCM driver to the VCM also stops to disable operation of the actuator.

Hence, the drive requires a system for urgently executing retract operation of moving the head to the CSS area. This system will be explained with reference to FIG. 13.

As shown in FIG. 13, this system is roughly made up of a retract circuit 22, rectifier 23, and switches 26 and 27. The rectifier 23 rectifies an AC back electromotive force (back EMF) induced by the coil of a spindle motor (SPM) 15. The SPM 15 receives a driving current from an SPM driver 21 to rotate a disk as a recording medium when the power supply (main power supply) of the drive is turned on. The SPM driver 21 rotates the SPM 15 at a predetermined speed by executing control of the driving phase of the SPM 15 and control of a current flowing through the coil of the SPM 15.

The retract circuit 22 monitors the voltage of the main power supply of the drive, and controls to turn on the switches 26 and 27 in accordance with detection of a power-off state. In accordance with operation of the switches 26 and 27, the rectifier 23 supplies a DC driving current to a voice coil motor (VCM) 16 in the power-off state. In the power-on state of the drive, the VCM 16 receives a driving current from a VCM driver 24 to drive the actuator on which the head is mounted. The actuator is a head moving mechanism of moving the head radially along the disk.

When the disk drive is powered down, the SPM driver 21 and VCM driver 24 are equivalently disconnected from the corresponding motors 15 and 16. The SPM 15 inertially rotates for a while even upon power down. At this time, the coil of the SPM 15 generates an AC back EMF. The rectifier 23 rectifies this back EMF into a DC voltage.

The retract circuit 22 monitors the power supply voltage, as described above. When the drive is powered down, the retract circuit 22 turns on the switches 26 and 27. In the power-off state, the back EMF from the rectifier 23 flows a DC current through the VCM 16 via a current limiting resistor 25. The driving VCM 16 automatically moves (retracts) the head to the CSS area on the disk even upon power down in the drive.

In this retract system, the SPM 15 and rectifier 23 correspond to so-called emergency reserve power supplies for the main power supply of the drive.

However, the retract system applied to the CSS type disk drive suffers the following problems.

As shown in FIG. 13, this system rectifies a back EMF from the SPM 15 by the rectifier 23, and limits a current supplied to the VCM 16 via the series resistor 25. For this reason, the current supplied to the VCM 16 is determined by the back EMF and current limiting resistor 25. The back EMF decreases as the rotational speed of the SPM 15 decreases. However, a time (several sec) required to stop the SPM 15 and a time (several ten $\mu$sec) required to move the head to the CSS area are different by one or more orders of magnitude. Until the head reaches the CSS area, a predetermined current determined by the series resistor 25 is assumed to flow through the VCM 16.

Since the predetermined current flows through the VCM 16 until the head moves to the CSS area in the power-off state, the head moving speed by the VCM 16 is proportional to the time and to the 1/2nd power of the moving distance.

Assume that the radii of the CSS area, innermost track, and outer most track are 15 mm, 16 mm, and 31 mm, respectively. The collision speed of the actuator against the stopper when the head retracts from the outermost track to the CSS area is almost four times the collision speed when the head retracts from the innermost track. In the CSS type disk drive, however, since the actuator can be driven by a relatively small current, the collision speed against the stopper can be set to such a degree as not to damage the head or disk by a collision shock. This speed suffices to generate a force larger than the offset force of an FPC (Flexible Printed Circuit board) having a group of terminals connected to the head. Note that a head amplifier circuit for amplifying a reproduction output from the head or the like is mounted on the FPC. For stable operation, the driving current of the VCM is desirably set smaller when the head retracts from the outermost track to the CSS area than when the head retracts from the innermost track.

On the other hand, head loading/unloading type disk drives have been developed. The loading/unloading mechanism retracts (unloads) the head to a retract location outside the disk when the disk stops rotating. The retract location has a ramp for supporting the suspension of the actuator. At the rotation start of the disk, the loading/unloading mechanism moves (loads) the head from the retract location onto the disk after the rotational speed reaches a steady speed. Since the loading/unloading type drive can avoid contact between the head and disk, it can improve a smooth disk surface, reduce the head flying height, and increase the recording density, compared to the CSS type drive.

More specifically, as shown in FIGS. 2A and 2B, the loading/unloading mechanism has a ramp (retract location) 14 arranged outside and near a disk 11. Retract operation (unloading) moves a head (slider) 12 supported by a suspension 131 to the ramp 14 by driving of an actuator 13. The distal end (having a tab; not shown) of the suspension 131 slides onto a ramp surface 141 of the ramp 14. The head (slider) 12 is lifted up and unloaded from the surface of the disk 11. The actuator 13 stops at a predetermined position on the outer side of the disk 11 by a stopper (not shown).

In a normal operation state when the drive is powered on, unloading operation of the head 12 is controlled by a microprocessor (CPU). In unloading operation, the moving speed of the actuator is precisely controlled. This is because if the moving speed of the actuator 13 is unnecessarily high, the suspension 131 comes into contact with the ramp surface 141 of the ramp surface 141 with a large shock, and may damage the disk 11 and head 12.

If the drive is powered down before execution of unloading operation (retract operation), the disk stops rotating, and the head 12 collides against the disk 11, similar to the CSS type drive. To avoid this, when the main power supply is powered down, the loading/unloading type drive also supplies a current to the VCM 16 from a reserve power supply using the back EMF of the SPM 15, and drives the actuator to execute head emergency retract operation (i.e., unloading).

However, since the CPU is disabled while the main power supply is OFF, the CPU cannot perform speed adjustment (retract control) of the actuator. The ramp 14 serving as a retract position is arranged outside the disk 11. Thus, when the head is unloaded from the innermost track to the ramp 14, the moving speed when the distal end of the suspension 131 comes into contact with the ramp surface 141 is almost four times the moving speed when the head retracts from the outermost track.

Compared to the CSS type drive, the loading/unloading type drive must flow a larger driving current through the VCM even in retracting the head from the outer side of the disk because the distal end of the suspension 131 slides onto the ramp surface 141 with a large frictional force. For this purpose, as shown in FIG. 14, the loading/unloading type drive flows a larger current through the VCM 16 in head unloading operation (time TU) than in normal head positioning operation (time TP).

FIG. 14 shows changes in VCM current value over time in head positioning operation (a time TP) before power down (power on), and VCM current value in head unloading operation (a time TU) when the power-off state is detected (time TA). As is apparent from FIG. 14, the driving current supplied to the VCM 16 is large in unloading operation. The current value supplied to the VCM 16 (a current from the reserve power supply) is set based on head unloading operation from the outer side of the head in the power-off state. At this time, if the drive is powered down while the head is positioned on the inner side of the disk, the actuator 13 moves to the ramp 14 to collide against the ramp surface 141 or stopper at an excessive speed in accordance with a current supplied to the VCM 16. As a result, the actuator 13 may damage the head 12 or disk 11 with high possibility. To avoid this, the moving speed of the actuator (head) necessary for retract operation must be optimized in accordance with the head position before power down.

BRIEF SUMMARY OF THE INVENTION

It is an object of the present invention to stabilize head unloading operation in the power-off state of a drive by adjusting the moving speed of a head to prevent damage to the head or disk, and reliably unloading the head to a ramp in retract operation upon power down during operation in a head loading/unloading type drive.

To achieve the above object, according to the present invention, there is provided an apparatus in a disk drive, comprising actuator means for supporting a head, and moving the head from a ramp serving as a retract position over a predetermined range on a disk surface, reserve power means, arranged separately from a main power supply of the disk drive, for supplying a driving current to the actuator means in power down of the main power supply, switching means for switching the driving current from the reserve power means to a high-level current value or low-level current value, and supplying the driving current to the actuator means, determining means for determining that the head comes into contact with the ramp when the head moves from the disk surface to the retract position, and control means for controlling the switching means in accordance with a determination result of the determining means upon power down of the main power supply so as to supply a driving current having a low-level current value from the reserve power means to the actuator means until the head moves to the ramp, and to supply a driving current having a high-level current value from the reserve power means to the actuator means when the head comes into contact with the ramp.

More specifically, the apparatus of the present invention drives a VCM with a reserve power supply using, e.g., the back EMF of an SPM when the main power supply of the drive is powered down. The apparatus sets the driving current value of the VCM to relatively low level until the actuator (head) moves from the disk surface to the ramp. This reduces a shock when the actuator comes into contact with the ramp. To the contrary, the apparatus sets the driving current value of the VCM to relatively high level after the actuator comes into contact with the ramp. This allows sliding the actuator onto the ramp and reliably unloading the head.

In other words, when the main power supply of the drive is powered down, the apparatus of the present invention appropriately adjusts the speed when the actuator moves from a position on the disk surface to the ramp, and the moving speed after the actuator reaches the ramp. Accordingly, the actuator (head) can be prevented from colliding against the ramp at an excessively high speed. When the actuator slides onto the ramp, it can reliably unload the head to the ramp at a speed exceeding the frictional force between the actuation and ramp.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a timing chart showing a change in VCM voltage over time in the system;

FIGS. 7A to 7C are waveform charts and a timing chart, respectively, showing operation of the determining circuit in the system;

FIG. 8 is a block diagram showing a modification of the ramp collision determining circuit;

DETAILED DESCRIPTION OF THE INVENTION

Embodiments of the present invention will be described below with reference to the several views of the accompanying drawing.

Arrangement of Disk Drive

A disk drive according to the following embodiments assumes a head loading/unloading type hard disk drive (HDD). The structure of the HDD will be described with reference to FIGS. 1, 16, 17A, and 17B.

Figure 1:
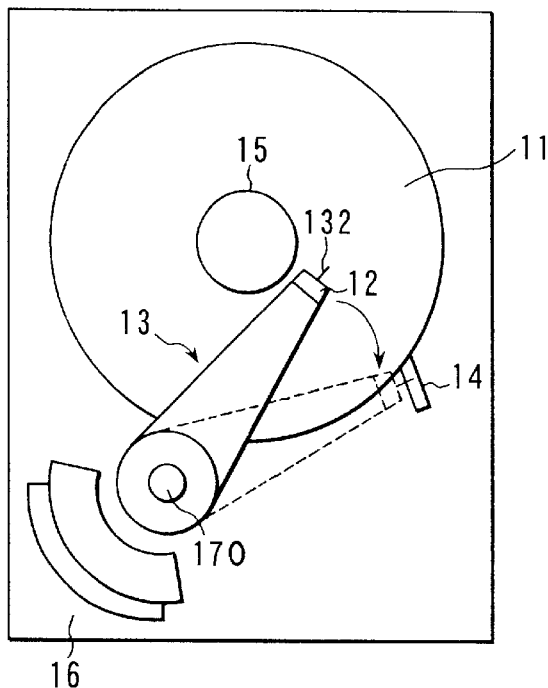
FIG. 1 is a view showing the main part of a loading/unloading type disk drive according to the present invention.
Figure 2A:
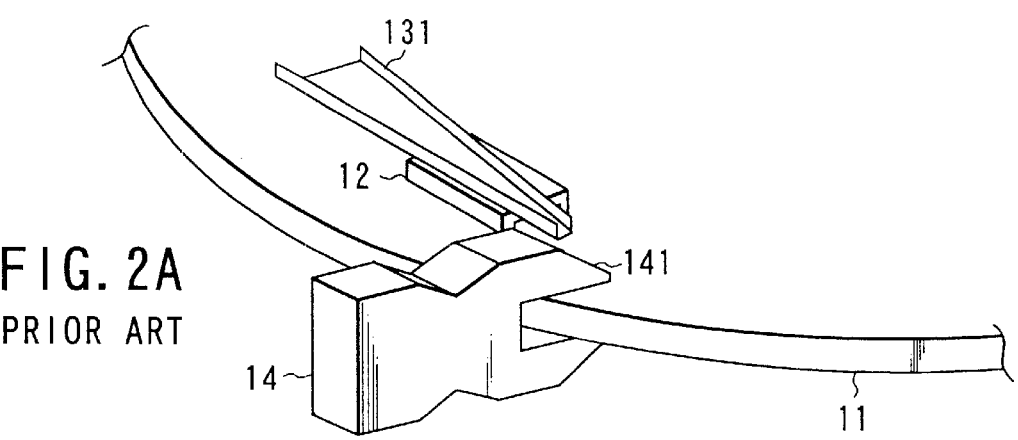
FIGS. 2A and 2B are views for explaining operation of a conventional loading/unloading type disk drive and a ramp structure.
Figure 2B:
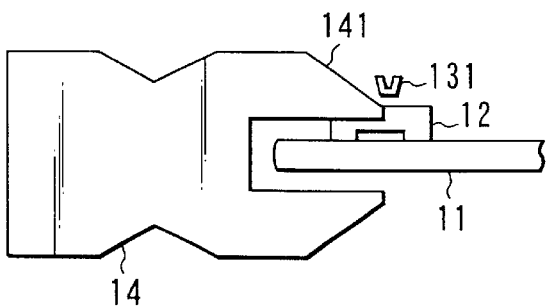

As shown in FIG. 1, the head loading/unloading type HDD has a ramp 14 arranged outside and near a disk 11 (see FIGS. 2A and 2B). In unloading operation (retract operation), an actuator 13 moves toward the outer side of the disk 11 (arrow direction), and a tab (or load beam) 132 attached to a suspension slides onto the ramp 14 to retract a head (slider) 12 in a noncontact state with the disk 11.

Figure 17A:
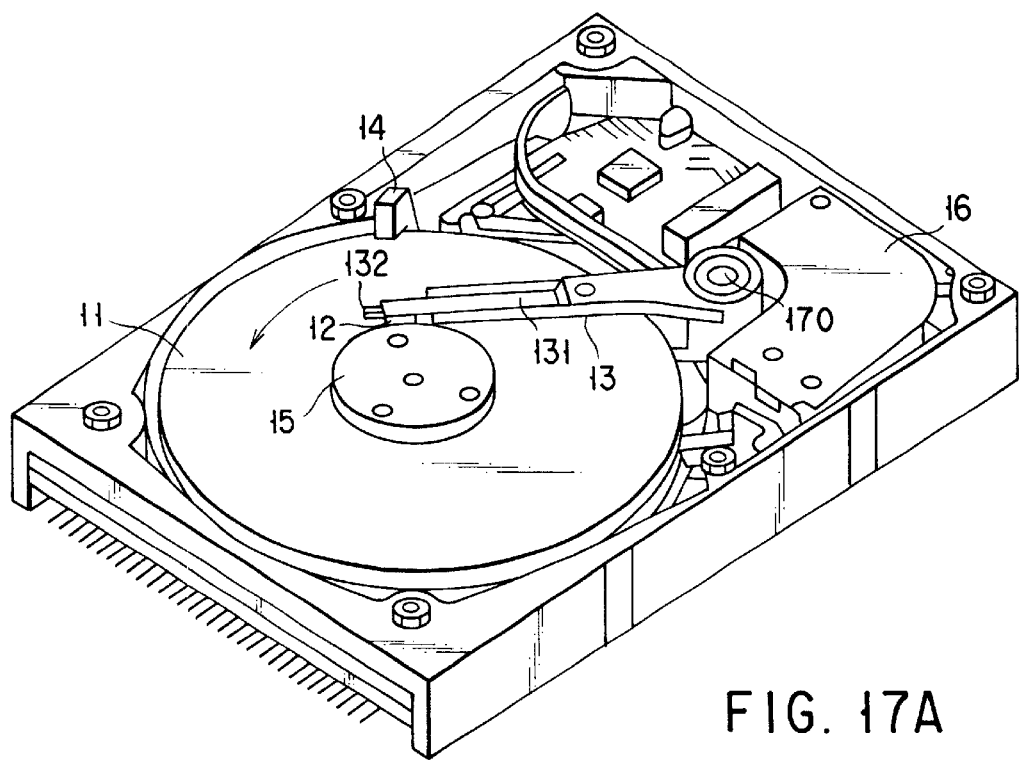
FIGS. 17A and 17B are a perspective view and a plan view, respectively, showing the structure of the EDD according to the present invention.
Figure 17B:
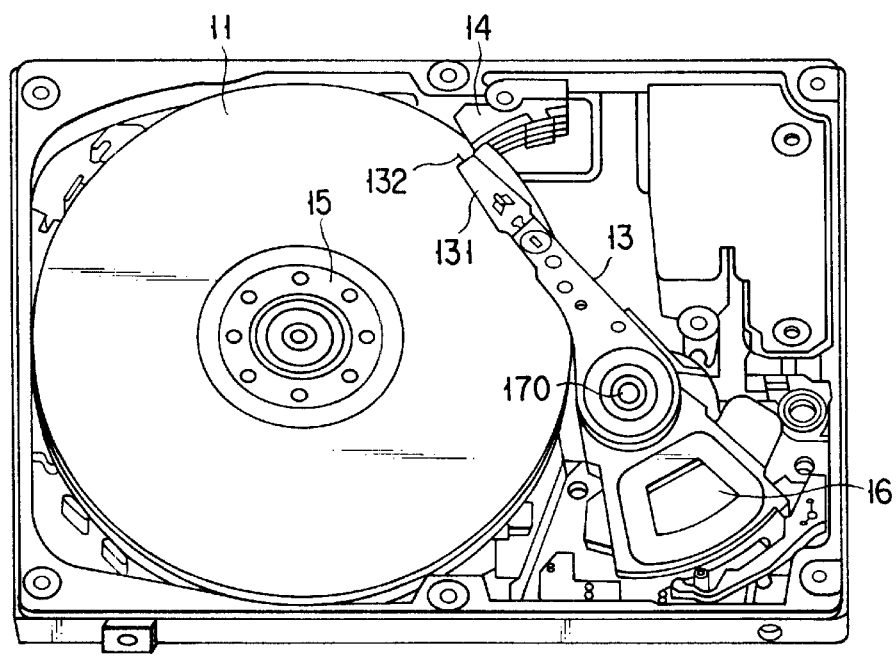

As shown in FIGS. 17A and 17B, the actuator 13 is a rotary head moving mechanism of moving radially along the disk 11 about a rotating shaft 170 by the driving force of a VCM 16. In loading operation, the disk 11 rotates at a high speed by an SPM 15. The head 12 moves apart from the ramp 14 by the actuator 13 while floating on the rotating disk 11.

Each surface of the disk 11 has many concentric tracks (cylinders). Each track has a servo area where servo data necessary for seek control (positioning control) of the head is recorded, and a user area where user data is recorded. This embodiment assumes one disk 11 for descriptive convenience. In general, heads 12 are respectively arranged in correspondence with the respective surfaces of the disk 11, as shown in FIG. 16.

Figure 16:
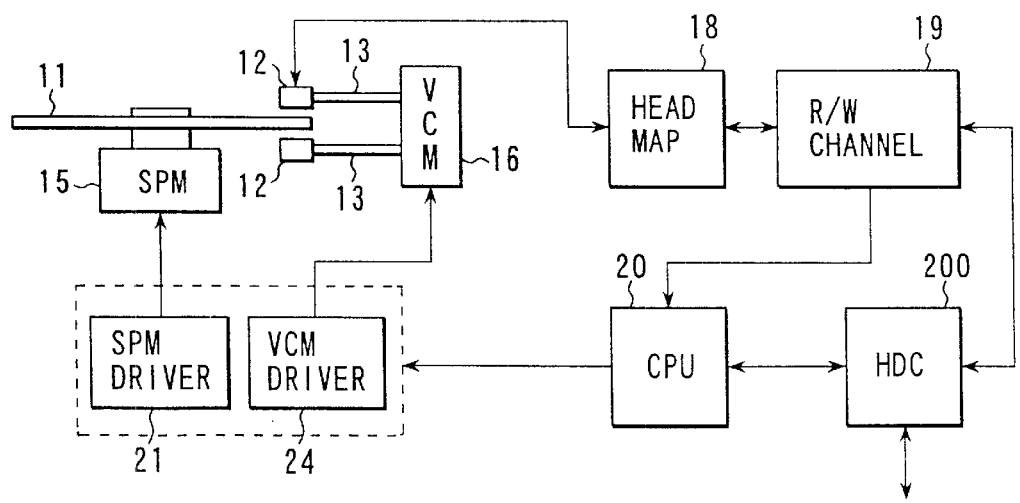
FIG. 16 is a block diagram showing the main part of an HDD according to the present invention.

As shown in FIG. 16, the HDD comprises a control system for controlling an assembly having the disk 11, head 12, actuator 13 (including the VCM 16), and SPM 15. The control system includes an unloading control system (to be describe later; see FIG. 3). The control system is roughly constituted by a head amplifier 18, read/write (R/W) channel 19, CPU (microprocessor or microcontroller) 20, and disk controller (HDC) 200.

The head amplifier 18 is connected to the head 12 via an FPC to input/output a read/write signal to/from the head 12. The head amplifier 18 amplifies an analog read signal read out by the head (read head) 12, and sends the amplified signal to the R/W channel (R/W IC) 19. The head amplifier 18 converts write data (digital data) sent from the R/W channel 19 into a write current, and sends the write current to the head (write head) 12.

The R/W channel 19 has an AGC (Automatic Gain Control) function for keeping a read signal input from the head amplifier 18 at a predetermined voltage level, a decoding function of performing signal processing necessary for reconstruction of data of, e.g., NRZ codes from the read signal amplified by the AGC function, an encoding function of performing signal processing necessary for data recording on the disk 11, and a function of extracting servo data from the read signal.

The CPU 20 is the main control device of the control system, and executes various control operations of the HDD in accordance with control programs stored in a ROM (Read Only Memory; not shown). The CPU 20 controls driving of the actuator 13 by a control value supplied to a VCM driver 24, and executes control of positioning the head 12 to a target position (target track) on the disk 11. The CPU 20 controls the rotational speed of the SPM 15 by a control value supplied to an SPM driver 21. The VCM driver 24 supplies a driving current corresponding to the control value from the CPU 20 to the VCM 16 when the main power supply of the drive is powered on. The SPM driver 21 supplies a driving current corresponding to the control value from the CPU 20 to the SPM 15 when the main power supply of the drive is powered on. The HDC 200 constitutes an interface between the drive and host system (computer or the like), and executes control of read/write data transfer and the like.

Unloading Control System and Operation

The unloading control system and operation according to the first embodiment will be described with reference to FIGS. 3 to 6 and FIGS. 7A to 7C.

When the main power supply of the drive is powered down, this system supplies a driving current (a current corresponding to a VCM voltage applied to a coil) to the VCM 16 using a back EMF generated on the SPM 15 which keeps rotating, and moves and unloads the actuator 13 (head 12) to the ramp 14 (retract operation). At this time, the system switches the application voltage to the VCM 16 in two steps. That is, the system uses different current values supplied to the VCM 16 before and after the head 12 reaches the ramp 14.

Figure 3:
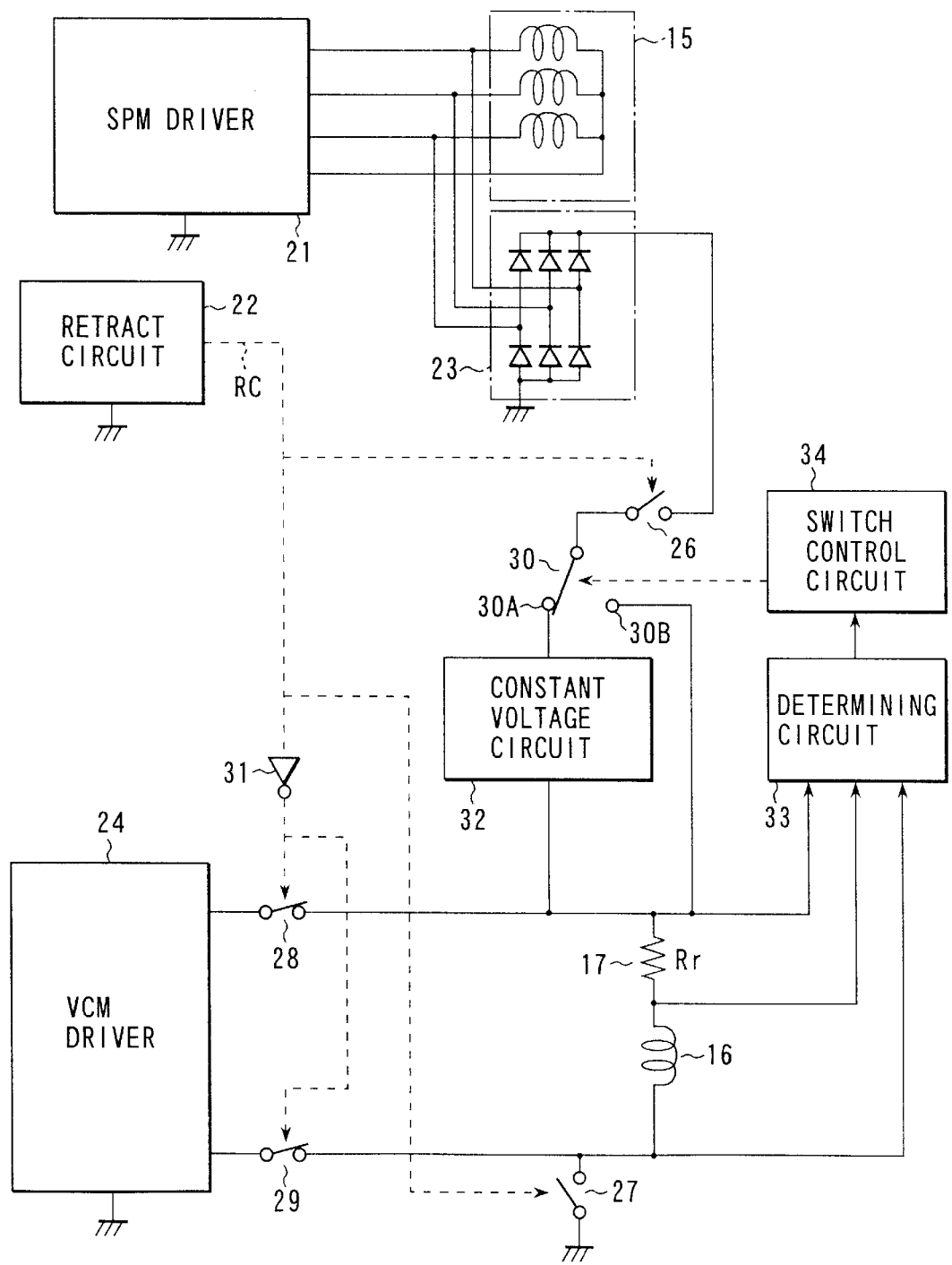
FIG. 3 is a block diagram showing the main part of an unloading control system according to the first embodiment of the present invention.

In FIG. 3, a retract circuit 22 monitors the main power supply voltage of the drive, and when detecting the power-off state, outputs a detection signal RC to switch switches 26 and 27 from the OFF state to the ON state and switches 28 and 29 from the ON state to the OFF state. Then, the VCM driver 24 is electrically disconnected from the VCM 16. At the same time, the output of a rectifier 23 is electrically connected to a switch 30 via the switch 26. This switch 30 has two nodes 30A and 30B, and is connected to one node 30A in a normal state. The node 30A is connected to the input of a constant voltage circuit 32. Immediately upon detection of the power-off state, the rectifier 23 supplies a DC voltage by the back EMF to the constant voltage circuit 32.

The constant voltage circuit 32 limits the DC voltage from the rectifier 23 to a predetermined voltage value or less, and applies the limited voltage to the VCM 16 (more specifically, a series circuit made up of the coil of the VCM 16 and a sense resistor 17 for detecting a current flowing through the coil). Then, not the DC voltage itself by the back EMF from the rectifier 23, but the predetermined voltage (the first step voltage) limited by the constant voltage circuit 32 which is smaller than the maximum value of the DC voltage (the maximum value of the second step voltage) is applied across the coil of the VCM 16 immediately upon detection of the power-off state. The second step voltage is a VCM voltage 61 indicated by the dotted line shown in FIG. 6. The first step voltage is a VCM voltage 60 indicated by the solid line shown in FIG. 6.

A determining circuit 33 for ramp collision (contact of the actuator 13 with the ramp 14) is connected to one terminal of the coil of the VCM 16, the common node between the other terminal of the coil of the VCM 16 and one terminal of the sense resistor 17, and the other terminal of the sense resistor 17. The determining circuit 33 detects a change in back electromotive voltage (back EMV) induced by the coil of the VCM 16 to determine ramp collision and output an effective determination signal (output 73 in FIG. 7C).

When the determining circuit 33 outputs the effective determination signal, a switch control circuit 34 switches the switch 30 from the node 30A to the node 30B. This state is maintained while the determining circuit 33 outputs the effective determination signal. The node of the switch 30 is connected to the series circuit made up of the coil of the VCM 16 and the sense resistor 17. The VCM 16 (series circuit) receives an output voltage (first step voltage 60 of lower level) from the constant voltage circuit 32 before the determining circuit 33 determines ramp collision. That is, the head 12 is moving to the ramp 14. When the determining circuit 33 determines ramp collision (at time T3 shown in FIGS. 6, 7A, and 7B), the output voltage from the constant voltage circuit 32 is switched to the DC voltage itself (second step voltage 61 of high level) by the back EMF from the rectifier 23, and the DC voltage is applied to the VCM 16. In short, this system switches a voltage value applied to the coil of the VCM 16 from a low-level voltage to a high-level voltage in accordance with a ramp collision determination output from the determining circuit 33 upon detection of the power-off state. Note that the switches 26 to 30 are formed from FETs or the like, and can operate even if the main power supply is OFF.

Arrangement of Determining Circuit 33

Figure 4:
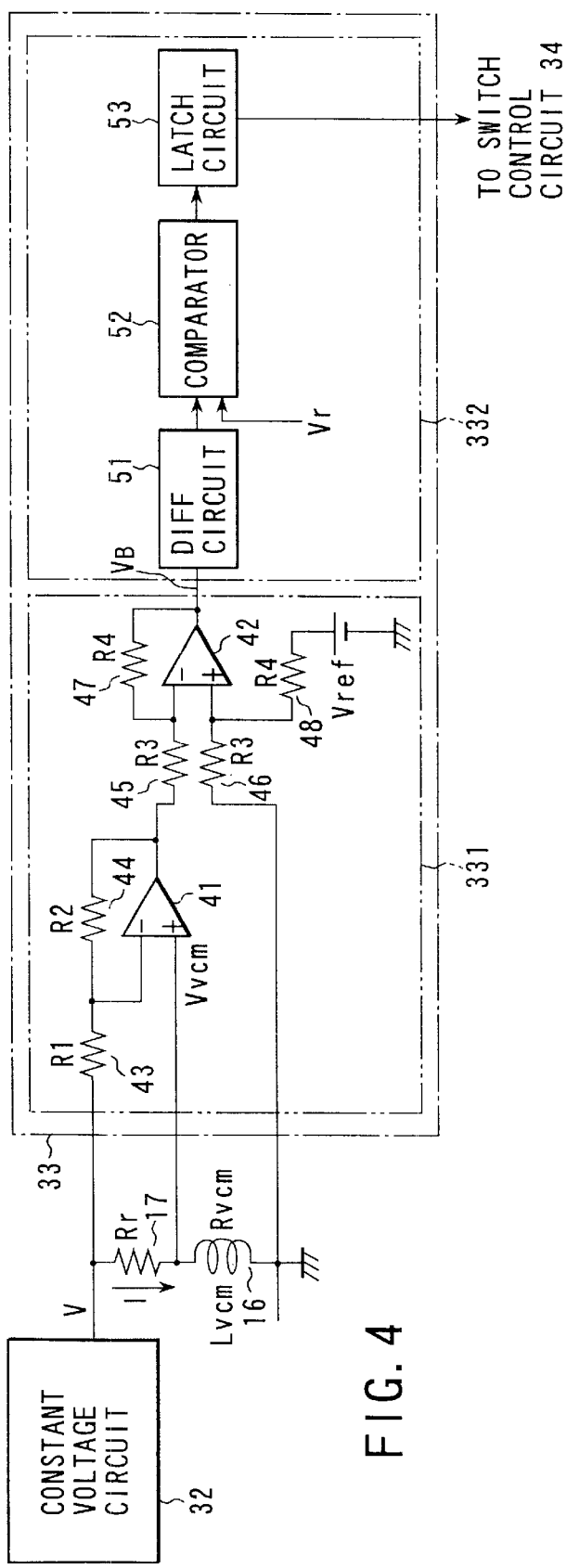
FIG. 4 is a block diagram showing a ramp collision determining circuit in the system.

As shown in FIG. 4, the determining circuit 33 comprises a back electromotive voltage (back EMV) detection circuit 331 and ramp collision detection circuit 332. The detection circuit 331 is connected to one terminal of the coil of the VCM 16, the common node between the other terminal of the coil of the VCM 16 and one terminal of the sense resistor 17, and the other terminal of the sense resistor 17. The detection circuit 331 detects a back EMV induced on the coil of the VCM 16. The detection circuit 331 is mainly made up of differential amplifiers 41 and 42, and resistors 43 to 48.

Letting R1 and R2 be the resistance values of the resistors 43 and 44, R3 be the resistance value of the resistors 45 and 46, and R4 be the resistance value of the resistors 47 and 48, an output voltage V from the constant voltage circuit 32, i.e., a voltage at the common node between the sense resistor 17 and the resistor 43 in the detection circuit 331 in FIG. 4 is given by $$V = I(Rr + Rvcm) + Lvcm\, dI/dT + BEMV \tag{1}$$

where Rr: the sense resistance
- Rvcm: the coil resistance of the VCM 16
- I: a current flowing through the VCM 16
- Lvcm: the coil inductance of the VCM 16
- BEMV: the back electromotive voltage of the VCM 16
- dI/dT: a differential result at time T When a change in current I over time is small (until ramp collision), the influence of term Lvcm is negligibly small to $$Lvcm\, dI/dT \approx 0 \tag{2}$$

Equation (1) is rewritten into $$V = I(Rr + Rvcm) + BEMV \tag{3}$$

Equation (3) yields the back electromotive voltage VEMV of the VCM 16:

$$BEMV = V - I(Rr + Rvcm) = V - IRr - IRvcm \tag{4}$$

For a voltage Vvcm at the coil terminal of the VCM 16:

$$Vvcm = V - IRr \tag{5}$$

equation (4) is rewritten into $$BEMV = Vvcm - IRvcm \tag{6}$$

An output voltage VB from the detection circuit 331 in FIG. 4 is given by $$VB = (R4/R3)\{IRr(R2/R1) - Vvcm\} + Vref \tag{7}$$

where Vref: the reference voltage

By setting the values (constants) Rr, R2, and R1 by $$Rr(R2/R1)=Rvcm \qquad (8)$$

equation (7) is rewritten into $$VB=(R4/R3)\,(IRvcm-Vvcm)+Vref \qquad (9)$$

Since "BEMV=Vvcm−IRvcm" from equation (6), equation (9) is further rewritten into $$VB=(R4/R3)\,(-BEMF)+Vref \qquad (10)$$

As is apparent from equation (10), the output voltage VB from the detection circuit 331 is proportional to BEMV of the VCM 16 using the reference voltage Vref as a center. In other words, the detection circuit 331 can detect the BEMF of the VCM 16. Note that the detection circuit 331 has the same circuit arrangement as a detection circuit of detecting the BEMV of the VCM 16 in order to control the speed of the actuator 13 (head 12) in a normal power-on state.

The signal waveform of the output voltage VB from the detection circuit 331 (the BEMV of the VCM 16) is supplied to the ramp collision detection circuit 332. The detection circuit 332 is made up of a differentiating circuit 51, comparator 52, and output latch circuit 53.

The differentiating circuit 51 differentiates the output voltage VB from the detection circuit 331 as a function of time. FIG. 7B is a waveform chart showing an output from the differentiating circuit 51. This output corresponds to a differential signal with respect to the back electromotive voltage of the VCM 16. By comparing an output from the differentiating circuit 51 with a reference value (Vr) by the comparator 52, a change in BEMV of the VCM 16 over time, i.e., ramp collision can be detected.

The comparator 52 outputs a signal (72 in FIG. 7C) which becomes effective only while an output from the differentiating circuit 51 is equal to or higher than the reference value (Vr). The output latch circuit 53 latches the effective output 72 from the comparator 52, and sends the latch output as a ramp collision determination signal 73 to the switch control circuit 34. The switch control circuit 34 switches the switch 30 from the node 30A to the node 30B in accordance with the input timing of the effective ramp collision determination signal 73. As a result, the application voltage to the VCM 16 is switched from a low-level DC voltage (first step voltage 60) from the constant voltage circuit 32 to a high-level DC voltage (second step voltage 61) from the rectifier 23. Note that a filter (low-pass filter, bandpass filter, or the like), integrating circuit, and the like may be added to stabilize the ramp collision detection circuit 332 and increase the determination precision.

Arrangement of Constant Voltage Circuit 32

Figure 5:
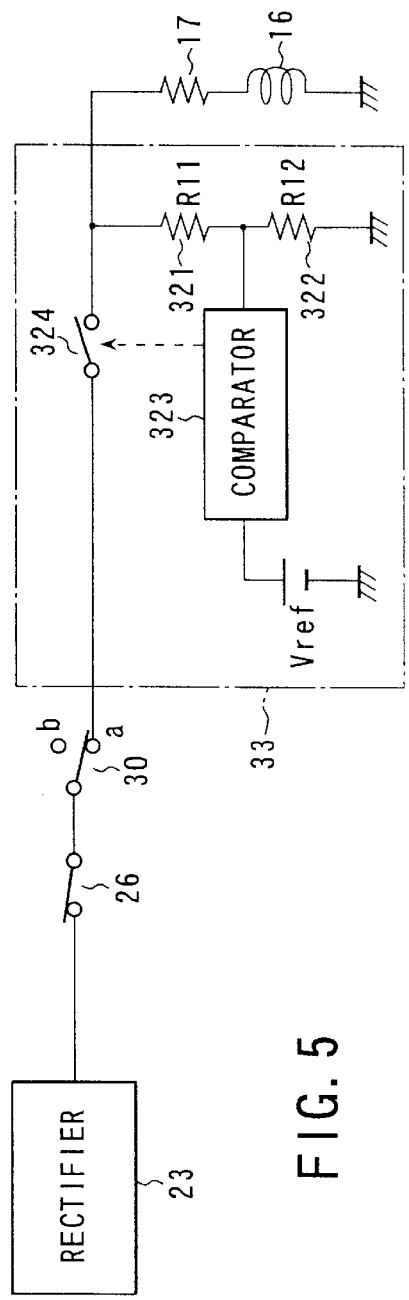
FIG. 5 is a block diagram showing a constant voltage circuit in the system.

As shown in FIG. 5, the constant voltage circuit 32 comprises a series circuit of resistors 321 and 322 for dividing the application voltage to the VCM 16, a comparator 323, and a switch 324 formed from an FET or the like.

The comparator 323 compares a voltage at the common node between the resistors 321 and 322 with the reference voltage (Vref). That is, the comparator 323 monitors a voltage obtained by dividing the application voltage to the VCM 16, thereby monitoring a voltage at the coil terminal of the VCM 16. When the target voltage is equal to or lower than the reference voltage, the comparator 323 turns on the switch 324 to directly apply a DC voltage from the rectifier 23 to the VCM 16. To the contrary, when the target voltage exceeds the reference voltage, the comparator 323 turns off the switch 324 to prevent application of the DC voltage from the rectifier 23 to the VCM 16. By turning off the switch 324, the voltage applied to the coil terminal of the VCM 16 is controlled to a predetermined voltage determined by the resistance ratio between the reference voltage and the resistors 321 and 322. The predetermined voltage is at lower level than the DC voltage (high-level voltage) from the rectifier 23.

Unloading operation (retract operation) in this unloading control system according to the first embodiment will be explained with reference to FIGS. 6 and 7A to 7C.

FIG. 6 shows a change in voltage over time applied to the coil terminal of the VCM 16 before and after power down. FIG. 7A shows the waveform of a VCM back EMV (BEMV) induced on the coil of the VCM 16. FIG. 7B shows a waveform (output from the differentiating circuit 51) obtained by differentiating BEMV by the time. FIG. 7C shows the detection timing of ramp collision.

As shown in FIG. 6, assume that the retract circuit 22 detects the power-off state at time T1. This time T1 is the start timing of unloading operation (an unloading operation time TU). A time TP means a time necessary for positioning operation of the head 12 before the power-off state. In this case, the system applies the first, low-level step voltage 60 (e.g., about 0.5V) to the VCM 16. As described above, the first step voltage 60 is at lower level than the maximum value (the maximum value of the second step voltage 61) of a DC voltage (a rectified voltage of back EMF) output from the rectifier 23.

By applying the first, low-level step voltage 60 to the VCM 16 from the power-off detection time T1, a current flows through the coil of the VCM 16 to generate the driving force of the VCM 16. As shown in FIG. 1, the driving force of the VCM 16 can accelerate the actuator 13 in the arrow direction outward the disk 11 to the ramp 14. Then, a back EMV of the VCM 16 proportional to the moving speed of the actuator 13 is generated on the coil of the VCM 16 (see FIG. 7A).

When the application voltage is almost constant at low level, the back EMV generated by the VCM 16 depending on the speed is balanced with the application voltage to the VCM 16, i.e., the first step voltage 60, and almost no current flows through the coil of the VCM 16. Hence, the actuator 13 (head 12) moves at a constant speed. When the head 12 reaches the ramp 14 at time T2, the distal end (tab 132) of a suspension 131 of the actuator 13 collides against a ramp surface 141 of the ramp 14. At this time, the tab 132 slides onto the ramp surface 141, and the actuator 13 is decelerated by a frictional force. During this, the back EMV of the VCM decreases to flow a current through the coil of the VCM 16, as shown in FIG. 7A.

The back EMV of the VCM is differentiated (by time) to obtain a differential waveform like the one shown in FIG. 7B, and a large change appears at the landing (collision) time T2 to the ramp 14. The determining circuit 33 detects this change to determine ramp collision. In other words, when the differential signal of the back EMV exhibits a change equal to or larger than the reference voltage Vr, the determining circuit 33 outputs the determination signal 73 from the comparator 52 at time T3 (see FIG. 7C).

After the head 12 collides against the ramp 14, the actuator 13 requires a driving force in order to slide onto the ramp surface 141 of the ramp 14. For this purpose, the switch control circuit 34 switches the switch 30 to the node 30B in accordance with the determination signal 73 at the ramp collision determination time T3. Consequently, a DC voltage (second, high-level step voltage 61) from the rectifier 23 is applied to the VCM 16.

As described above, when urgent unloading operation starts upon power down, unnecessary acceleration of the head 12 can be suppressed by a low-level VCM voltage until the head 12 reaches the ramp 14. After the head 12 collides against (comes into contact with) the ramp 14, the head 12 can be reliably retracted to the ramp 14 by a high-level VCM voltage.

Modification of Ramp Collision Determining Circuit 33

FIG. 8 is a block diagram showing a modification of the ramp collision determining circuit 33 used in this system.

As is apparent from equation (6), when the VCM 16 is driven by the voltage (V) from the constant voltage circuit 32, the differentiation result of the back electromotive voltage BEMV induced on the coil of the VCM 16 by the time is inversely proportional to a current I flowing through the VCM 16. A change in back electromotive voltage BEMV over time can, therefore, be detected by detecting a change in voltage over time applied to the coil of the VCM 16.

The determining circuit 33 of this modification determines ramp collision by detecting a change in voltage over time applied to the coil of the VCM 16. The determining circuit 33 of this modification basically has the same arrangement as the ramp collision detection circuit 332 shown in FIG. 4. That is, the determining circuit 33 comprises a differentiating circuit 333, comparator 334, and output latch 335. Note that the differentiating circuit 333 differentiates a voltage (V−IRr) at the coil terminal of the VCM 16 by the time, and receives a different input from the differentiating circuit 51 of the ramp collision detection circuit 332 shown in FIG. 4.

First Modification of Unloading Control System

Figure 9:
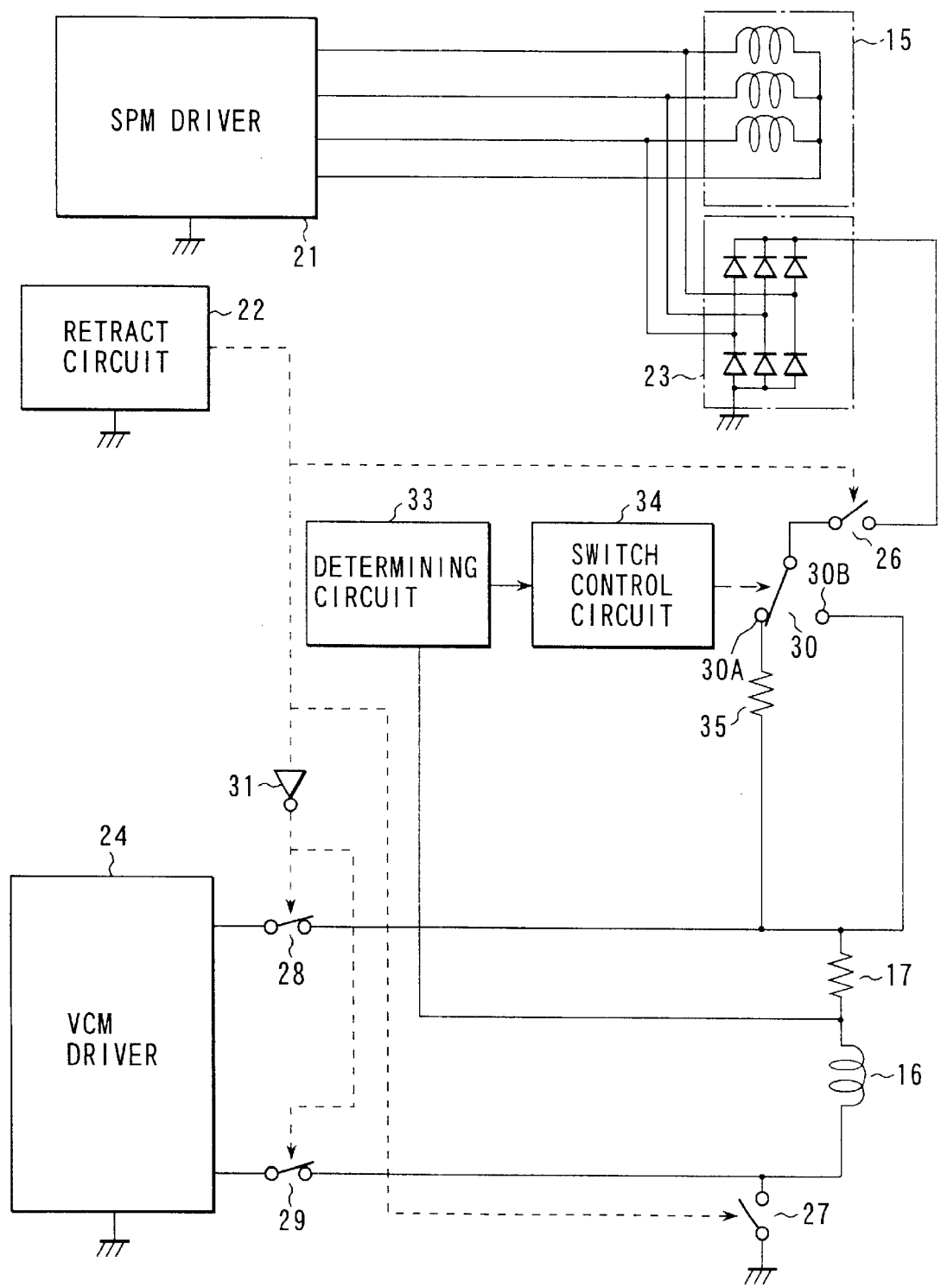
FIG. 9 is a block diagram showing the first modification of the system.

FIG. 9 is a block diagram showing the first modification of the system shown in FIG. 3.

The system of the first modification assumes that an output from the rectifier 23, i.e., a DC voltage obtained by rectifying a back EMF induced by the coil of the SPM 15 is almost constant so long as unloading operation is completed within a short time after power down.

More specifically, this system does not use the constant voltage circuit 32, but inserts a resistor 35 for limiting a current by a voltage applied to the coil of the VCM 16 between the node 30A of the switch 30 and the sense resistor 17. The resistor 35 limits a VCM current supplied to the VCM 16 to low level until ramp collision is detected upon detection of the power-off state. The resistor 35 has a larger resistance value than the sense resistor 17. The ramp collision determining circuit 33 determines ramp collision by monitoring a change in voltage over time at the common node between the sense resistor 17 and the coil of the VCM 16, i.e., a change in voltage over time applied to the coil of the VCM 16.

Second Modification of Unloading Control System

Figure 10:
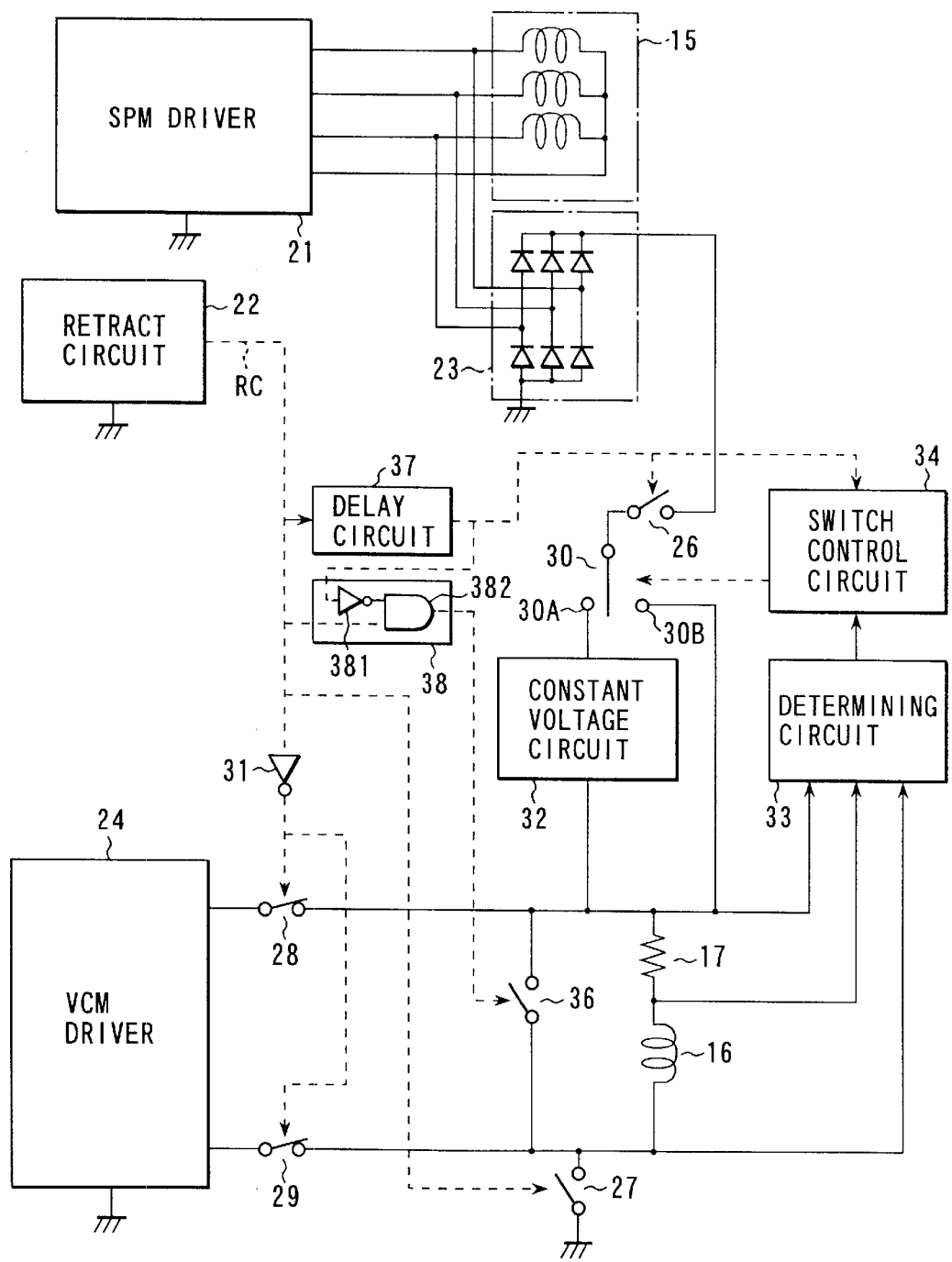
FIG. 10 is a block diagram showing the second modification of the system.

FIG. 10 is a block diagram showing the second modification of the system shown in FIG. 3.

The system of the second modification assumes that when the main power supply is powered down during seek operation of moving the head 12 to a target track on the disk 11 in drive operation, the BEMV of the VCM 16 becomes unstable immediately upon power down.

More specifically, this system comprises a switch 36 for short-circuiting a series circuit made up of the coil of the VCM 16 and the sense resistor 17 in order to short-circuit the two terminals of the coil of the VCM 16 immediately upon power down. The system further comprises a delay circuit 37 for delaying a power-off detection signal (RC) from the retract circuit 22, and a switch control circuit 38 for keeping the switch 36 on by the delay time of the delay circuit 37 upon detection of the power-off state. The switch control circuit 38 is made up of an inverter 381 and AND gate 382. In this system, the switch 30 is set to a neutral state in which it is connected to neither node 30A nor 30B under the control of the switch control circuit 34 when the main power supply is powered on. The switch control circuit 34 controls the switch 30 in accordance with an output from the delay circuit 37 and an output from the ramp collision determining circuit 33.

When the system detects the power-off state (outputs the detection signal RC) by the retract circuit 22, the switch control circuit 38 keeps the switch 36 on until the delay time by the delay circuit 37 elapses, i.e., during a predetermined period immediately upon detection of the power-off state. Hence, the series circuit made up of the coil of the VCM 16 and the sense resistor 17 is short-circuited. At this time, the switch 30 is in a neutral state, and no current is supplied to the VCM 16. After the lapse of the delay time, the switch control circuit 38 turns off the switch 36. At the same time, the switch control circuit 34 switches the switch 30 from the neutral state to the node 30A. Then, a constant voltage is applied from the constant voltage circuit 32 to the VCM 16.

With the arrangement of this system, when the main power supply is powered down during seek operation of the head 12, a time necessary for stabilizing the BEMV of the VCM 16 is ensured by the delay circuit 37. In other words, the power-off detection signal (RC) from the retract circuit 22 is held by the delay circuit 37 until the above time elapses. Particularly when the drive is powered down during seek operation, the determination precision of a change in BEMV of the VCM 16 over time can be increased.

Third Modification of Unloading Control System

Figure 11:
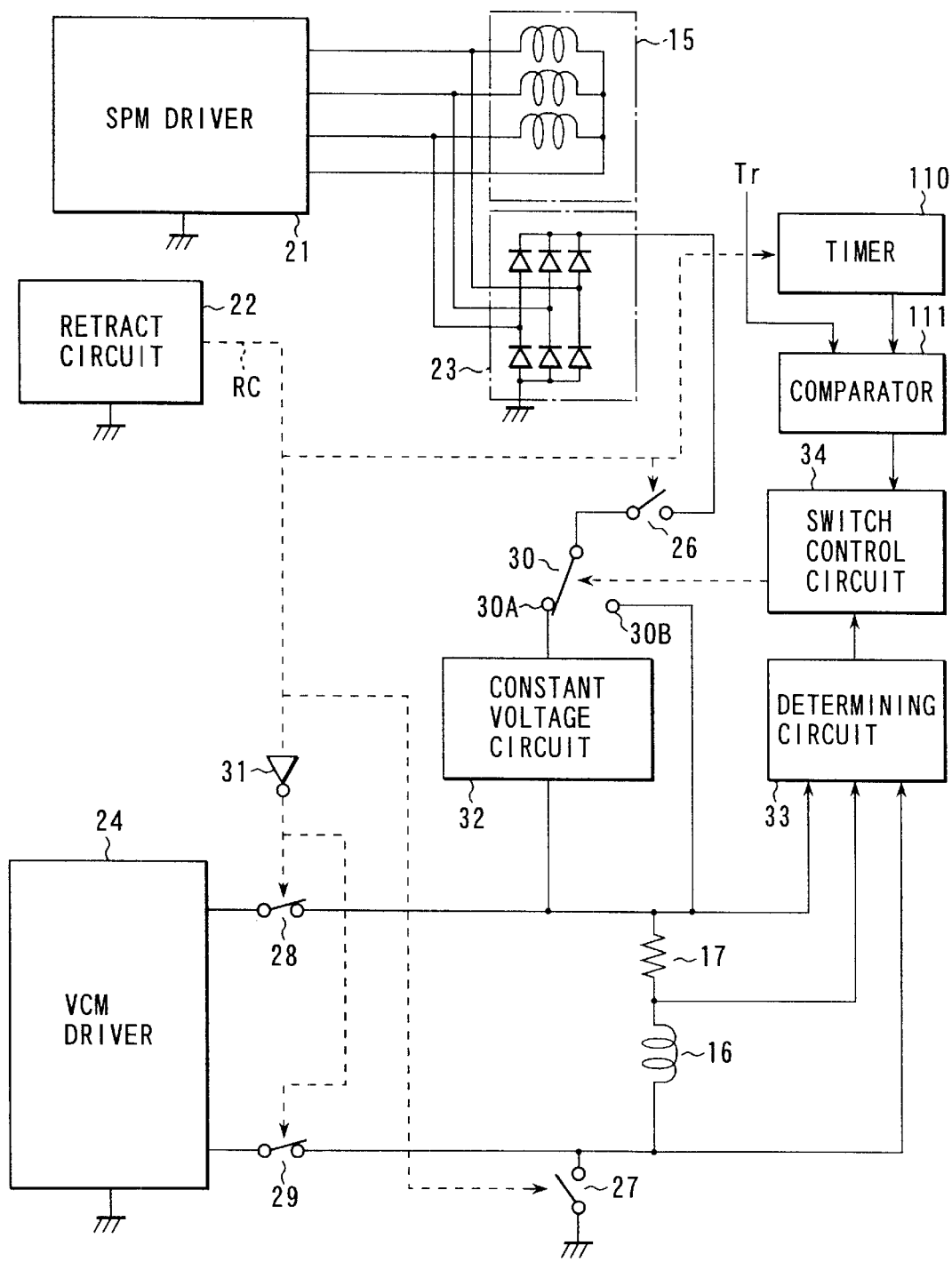
FIG. 11 is a block diagram showing the third modification of the system.

FIG. 11 is a block diagram showing the third modification of the system shown in FIG. 3. The system of the third modification has an arrangement in which when a preset time has elapsed after power down, the application voltage is switched from the first step voltage (60 in FIG. 6) to the second step voltage (61) even if no ramp collision is detected. The second step voltage (61) is high enough to slide the head 12 onto the ramp 14, as described above.

That is, the system comprises a timer (timer counter) 110 for measuring a lapse time upon detection of the power-off state (output RC), and a comparator 111 for comparing the time measurement value of the timer 110 with a reference time value (time limit value Tr) to determine whether the lapse time exceeds the time limit. The reference time is set long enough for the head 12 to reach the ramp 14 when the first step voltage (low-level voltage) from the constant voltage circuit 32 is applied to the VCM 16.

When the comparator 111 detects that the lapse time exceeds the time limit before the ramp collision determining circuit 33 detects ramp collision, the switch control circuit 34 forcibly switches the switch 30 from the node 30A to the node 30B. Then, the second step voltage (high-level voltage) is applied from the rectifier 23 to the VCM 16. Even if the ramp collision determining circuit 33 fails to detect ramp collision owing to a malfunction, the head 12 can be unloaded to the ramp 14.

The timer 110 measures a time by generating, e.g., clocks and counting the clocks. For this purpose, the timer 110 requires a clock generation circuit which consumes power. The timer 110 may be replaced by an SPM rotational pulse counter for counting the number of pulses per rotation that are generated by rotation of the SPM 15.

Fourth Modification of Unloading Control System

Figure 12:
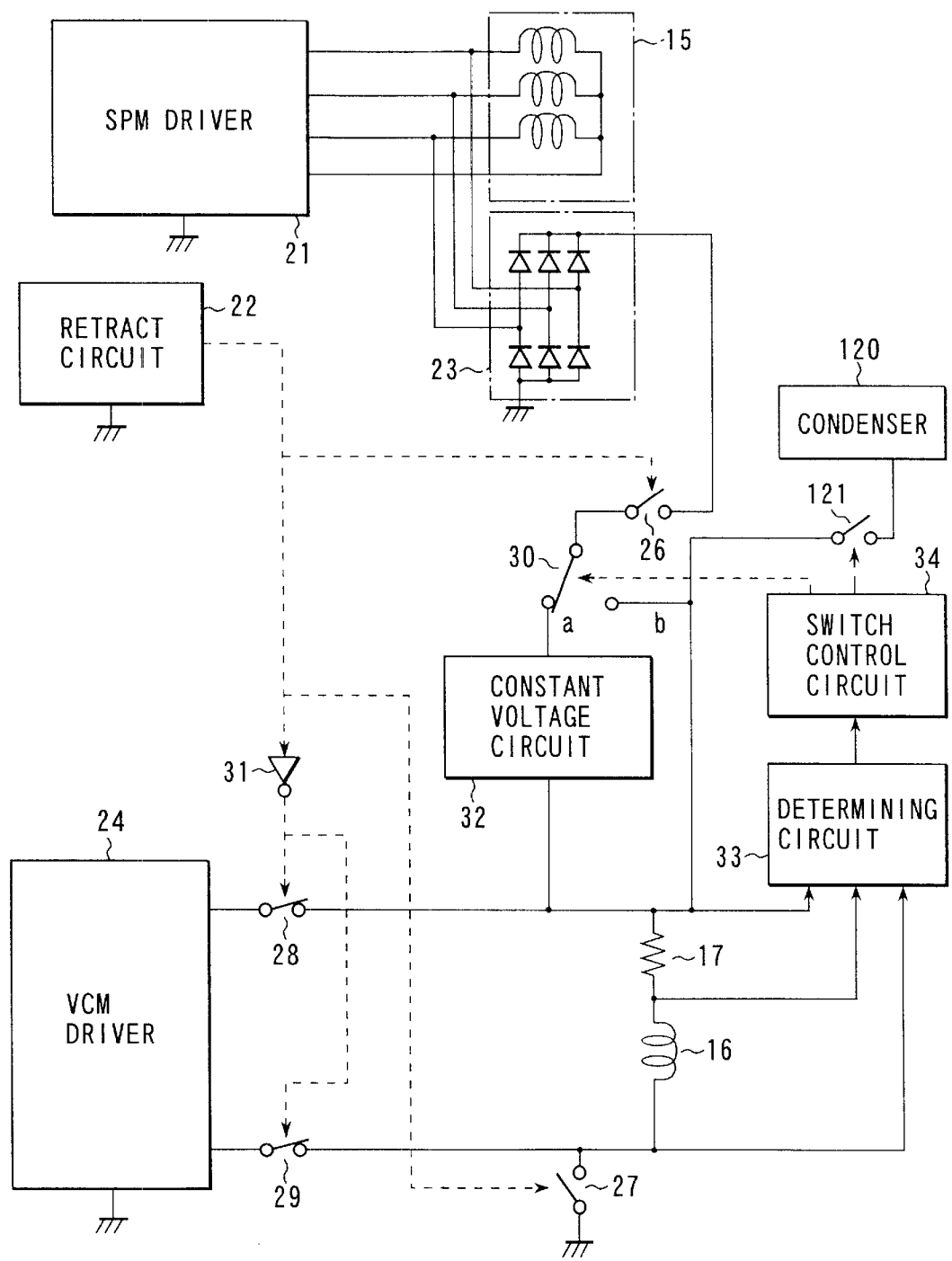
FIG. 12 is a block diagram showing the fourth modification of the system.
Figure 13:
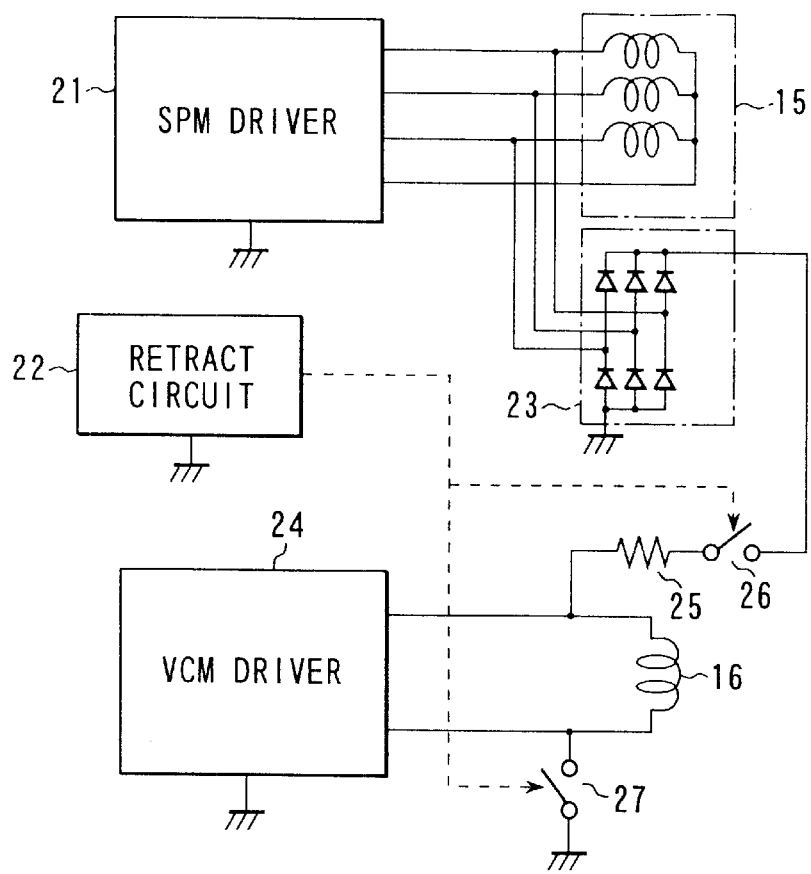
FIG. 13 is a block diagram for explaining a conventional retract system.
Figure 14:
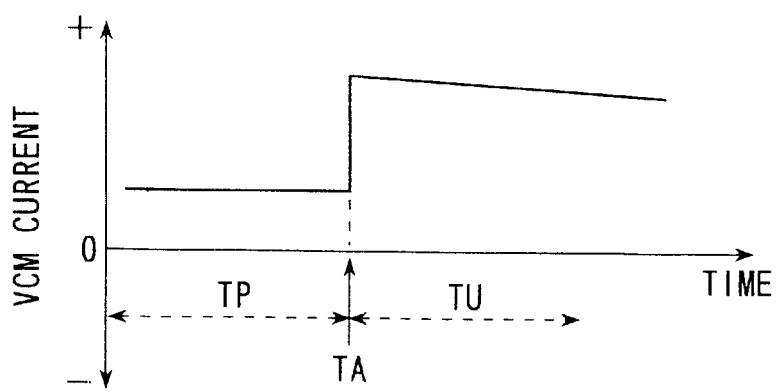
FIG. 14 is a timing chart showing a change in VCM current over time in the conventional system.

FIG. 12 is a block diagram showing the fourth modification of the system shown in FIG. 3.

The system of the fourth modification assumes that the torque becomes short in sliding the head 12 onto the ramp 14 when unloading operation is executed using a DC voltage from the rectifier 23 upon power down.

More specifically, the system comprises a capacitor (unloading capacitor) 120 for accumulating charges by the power supply (e.g., 5-V power supply) when the main power supply of the drive is turned on, and a switch 121 for supplying the charges (charge voltage) accumulated in the capacitor 120 to the node 30B of the switch 30.

This system also moves the head 12 to the ramp 14 by applying a predetermined voltage (first, low-level step voltage) output from the constant voltage circuit 32 until the ramp collision determining circuit 33 detects ramp collision upon detection of the power-off state.

When the head 12 reaches the ramp 14, and the ramp collision determining circuit 33 detects ramp collision, the switch control circuit 34 switches the switch 30 to the node 30B, and at the same time turns on the switch 121. Then, the charge voltage (about 5V) of the capacitor 120 is superposed on a DC voltage (about 2 to 3V) from the rectifier 23, and the total voltage is applied to the VCM 16. Accordingly, a satisfactory unloading power supply (reserve power supply) can be ensured compared to unloading operation executed by only the DC voltage from the rectifier 23. Note that the capacitor 120 is not used as a reserve power supply by itself, and suffices to have a minimum capacitance.

In the system of this embodiment, the capacitor 120 may be provided as a reserve power supply for unloading operation together with the rectifier 23, and may be used as a power supply for operation of the constant voltage circuit 32, determining circuit 33, and switch control circuit 34. Alternatively, the detection signal (RC) from the retract circuit 22 may be used as an operation timing signal for the constant voltage control circuit 32 and ramp collision determining circuit 33, and the circuits 32 and 33 may not operate when the main power supply is turned on.

As described in detail above, according to the system of the first embodiment, ramp collision is detected by monitoring the back electromotive voltage of the VCM coil or a voltage at the VCM coil terminal in head unloading operation upon power down. Before and after detection of ramp collision, a voltage applied to the VCM is switched to apply a larger voltage after detection of ramp collision. This stabilizes head unloading operation upon power down.

Second Embodiment

Figure 15:
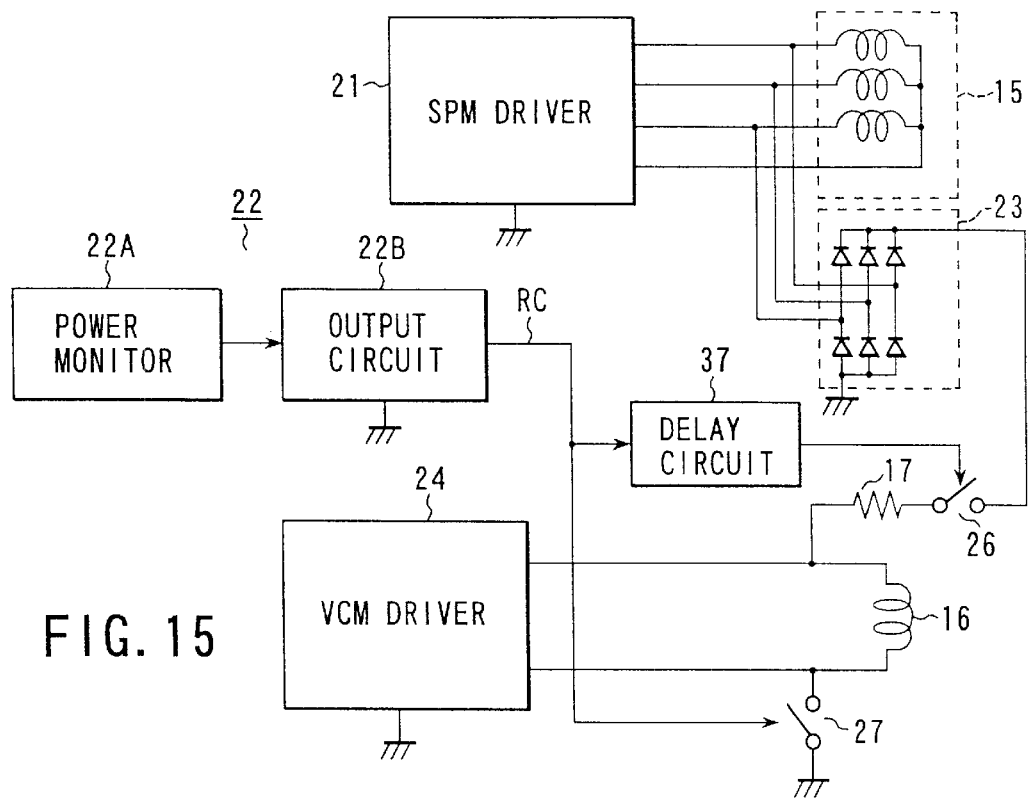
FIG. 15 is a block diagram showing the main part of an unloading control system according to the second embodiment of the present invention.

FIG. 15 is a block diagram showing an unloading control system according to the second embodiment. The system of the second embodiment has a function of suspending unloading operation (retract operation) using the back EMF of an SPM 15 for a predetermined time (delay time), i.e., delaying the operation when the main power supply of the drive is powered down. The system applies a DC voltage from a rectifier 23 to a VCM 16 not immediately but upon the lapse of a predetermined time upon power down of the main power supply. In other words, the system executes control of stopping supplying a driving current flowing through the VCM 16 by a predetermined time upon power down of the main power supply.

According to this system, although the SPM 15 inertially keeps rotating upon power down of the main power supply, an actuator 13 substantially stops because no current is supplied to the VCM 16 for a predetermined time. Hence, a head 12 mounted on the actuator 13 is at an indefinite position on a disk 11. However, the head 12 is soon influenced by an mechanical external force such as the external force of an FPC attached to the actuator 13, and stops within a range on the disk 11 where the force is balanced. Upon the lapse of a predetermined time upon power down of the main power supply, the moving distance (retract distance) of the head 12 from the disk 11 to a ramp 14 can be set within an almost constant range. Therefore, in executing unloading operation upon the lapse of a predetermined time, the moving speed (retract speed) required for the head 12 to reach (come into contact with or collide against) the ramp 14 can be stabilized.

System Arrangement and Unloading Operation

The system arrangement and unloading operation of the second embodiment will be described with reference to FIGS. 15, 18, and 19.

Similar to the system of the first embodiment, the system of the second embodiment retracts and unloads the head 12 to the ramp 14 in an emergency when the main power supply is powered down during drive operation. Normal unloading operation when a host system issues a stop instruction to the SPM 15 is executed by a CPU 20.

A retract circuit 22 comprises a power monitor 22A for the main power supply, and an output circuit 22B for outputting a power-off detection signal (so-called retract instruction signal) RC. The power monitor 22A has a function of always monitoring the voltage level of the main power supply of the drive, and detecting the power-off state.

A delay circuit 37 of this system delays output of the detection signal (retract instruction signal) RC from the retract circuit 22 by a predetermined time (delay time DT). This delay time DT corresponds to a time required for the head 12 to substantially stop within a predetermined range on the disk 11 upon power down.

Note that the system has almost the same arrangement as that shown in FIG. 3 except that the system does not use the constant voltage circuit 32 and ramp collision determining circuit 33 shown in FIG. 3.

Figure 19:
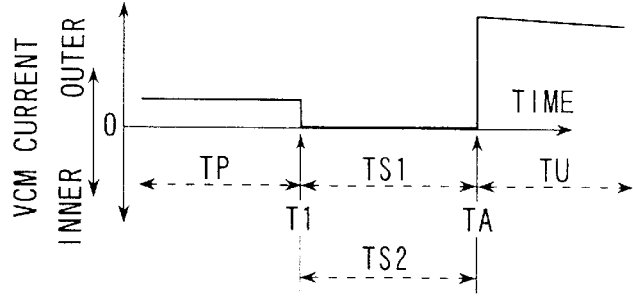
FIG. 19 is a timing chart for explaining VCM current characteristics in unloading operation according to the second embodiment.

The second embodiment assumes seek operation in which the main power supply of the drive is powered on to drive the actuator 13 by the VCM 16, and the head 12 is moving to a target track on the disk 11 (a time TP in FIG. 19). If the main power supply is powered down in this state (time T1), the retract circuit 22 detects this by the power monitor 22A and outputs the detection signal RC from the output circuit 22B.

After the main power supply is powered down, the functions of respective disk drive circuits including the functions of an SPM driver 21 and VCM driver 24 stop. The SPM 15 inertially keeps rotating, and generates a back EMF. The rectifier 23 converts an AC voltage by the back EMF into a DC voltage.

A switch 27 is turned on by the detection signal RC from the retract circuit 22, and grounds the other terminal of the coil of the VCM 16. A switch 26 is kept off because the delay circuit 37 delays output of the detection signal RC by the predetermined delay time DT. Therefore, no current by the DC voltage applied from the rectifier 23 to a series resistor 17 flows through the coil of the VCM 16.

Since the VCM 16 does not receive any current from a reserve power supply including the rectifier 23, the state of the actuator 13 on the disk 11 is indefinite. However, at the same time, the mechanical external force (offset force) of, e.g., an FPC (signal cable) which connects the head 12 and head amplifier 18 acts on the actuator 13, and the actuator 13 stops at a position on the disk 11 where the external force is balanced. As the external force, the frictional force of the bearing of the actuator 13, the magnetic force of a latch magnet, an air resistance by rotation of the disk 11, and the like are supposed to act in addition to the external force of the FPC attached to the actuator 13.

Figure 18:
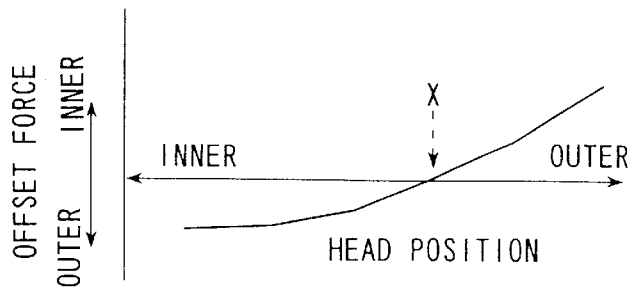
FIG. 18 is a graph for explaining the head stop position at the start of unloading operation according to the second embodiment.

As shown in FIG. 18, a stop position (X) of the head 12 can be estimated within a predetermined range from the inner to outer sides of the disk 11. This estimation can be done by measurement by actually powering down the main power supply during drive operation. In a disk drive using a rotary actuator 13, the mechanical external force of the FPC can be adjusted to set the position (X) within an intermediate range between the inner and outer sides on the disk 11 as the stop position of the head 12.

The delay time DT of the delay circuit 37 corresponds to a time (TS1) from power-off time T1 to time (TA) at which the head 12 moves to and stops at the stop position (X) on the disk 11, and unloading operation of the actuator 13 starts. Note that the delay time DT must be within a time during which a back EMF as a reserve power supply necessary for unloading operation is obtained before the SPM 15 stops rotating.

Upon the lapse of the predetermined delay time DT, the delay circuit 37 outputs the retract instruction signal RC to turn on the switch 26. In response to the ON operation of the switch 26, a current by a DC voltage from the rectifier 23 flows through the coil of the VCM 16. The current drives the VCM 16 to drive the actuator 13 and execute unloading operation of moving the head 12 to the ramp 14.

In this manner, emergency unloading operation of retracting the head 12 from the disk 11 to the ramp 14 can be executed upon the lapse of the predetermined time DT upon power down. In this case, according to the second embodiment, the head 12 can move near the predetermined position X on the disk 11 by setting the standby time (the suspension time of power supply to the VCM 16) between the power-off time T1 and the unloading operation start time TA. Thus, the moving distance of the head 12 in unloading operation can be predicted to adjust, e.g., the resistance value of the resistor 17 and adjust a current to the VCM 16. In unloading operation, the moving speed of the actuator 13 to the ramp 14 can be substantially optimized.

In other words, the moving distance of the head 12 to the ramp 14 can be made almost constant regardless of the position of the head 12 before power down. The speed can be optimized not to damage the head 12 when the head 12 (in practice, the suspension) collides against the ramp 14 along with driving the actuator 13 in unloading operation.

The stop position X of the head 12 upon power down is set on the outer side of the disk 11 by adjusting the external force of the FPC or the like by the design of a mechanical structure around the actuator 13. This can shorten the moving distance of the head 12 to the ramp 14 to suppress the moving speed of the actuator 13 to the ramp 14 in unloading operation. Instead, the stop position X of the head 12 upon power down may be set on the inner side, and the current value of a driving current to the VCM 16 may be decreased. In short, the stop position X of the moving head 12 upon power down can be set within a given range. For this reason, the driving force of the actuator 13 and the moving distance of the head 12 in unloading operation can be set within a certain range, and the moving speed of the head to the ramp 14 can be set to an appropriate value.

First Modification

Figure 21:
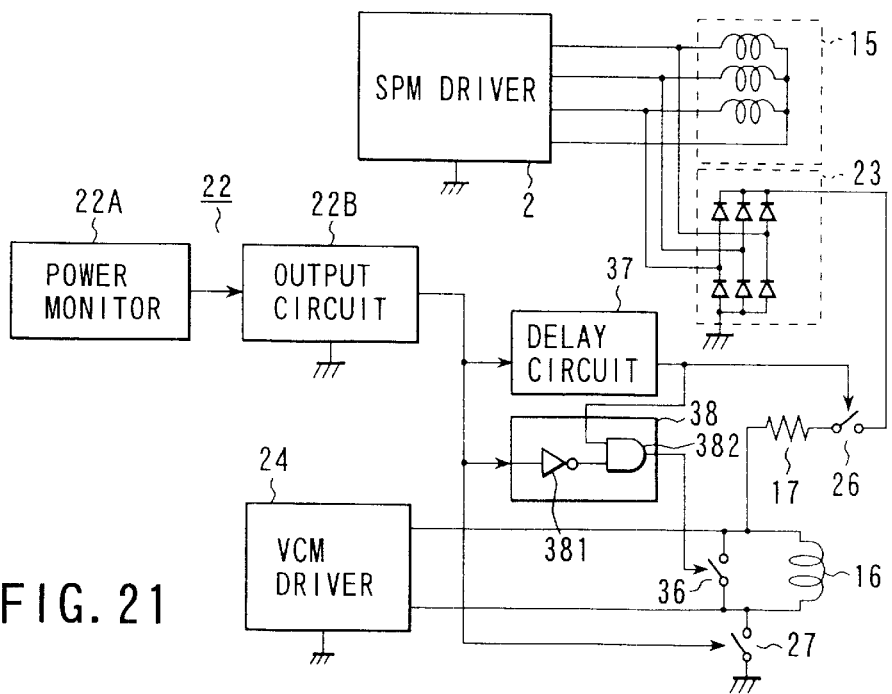
FIG. 21 is a block diagram showing the first modification of the system according to the second embodiment.

FIG. 21 is a block diagram showing the first modification of the system according to the second embodiment.

In unloading operation upon power down, the state before power down includes a state in which the head 12 is positioned at a target position or a read/write operation state, and a seek operation state. The former state does not spend a long time until the head 12 stops at the position X (unloading start position) upon power down. However, the seek operation state spends a given time until the head 12 moves to and stops at the unloading start position, owing to the presence of initial velocity.

To avoid this, the system of this modification comprises a means for short-circuiting the two terminals of the VCM coil and stopping driving the actuator 13 by the BEMV of the coil during the suspension period (delay time DT) of current supply to the VCM 16 upon power down. More specifically, as shown in FIG. 21, this system comprises a switch 36 and switch control circuit 38 for short-circuiting the two terminals of the coil of the VCM 16. The switch control circuit 38 is made up of an AND gate 382 and inverter 381. The switch control circuit 38 receives the retract instruction signal RC from the retract circuit 22 and an output from the delay circuit 37 to ON/OFF-control the switch 36.

Figure 20:
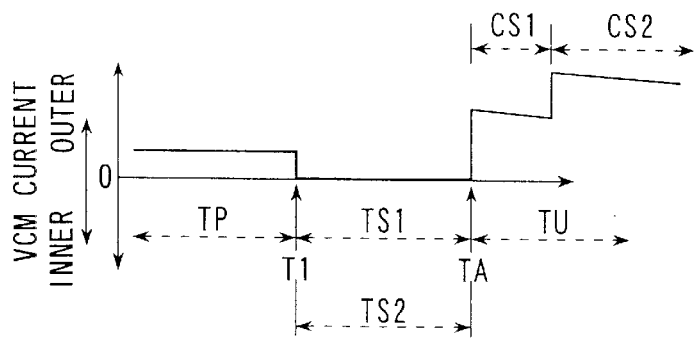
FIG. 20 is a timing chart for explaining VCM current characteristics in unloading operation according to the third modification of the second embodiment.

That is, as shown in FIG. 20, the switch control circuit 38 sets a coil short-circuiting period (a time TS2) for short-circuiting the two terminals of the VCM coil only during a period corresponding to the suspension period (the time TS1) of current supply to the VCM 16.

This arrangement can stop moving the actuator 13 by short-circuiting the two terminals of the coil of the VCM 16 even during seek operation of the head 12 upon power down. Hence, even if the actuator 13 is moving at initial velocity before power down, the movement can be suppressed to shorten the time required to move the head 12 to the unloading start position (position X). Since the OFF operation of the power supply disables control by the CPU 20, the actuator 13 may run away. However, the arrangement of the first modification can prevent such runaway.

Second Modification

Figure 22:
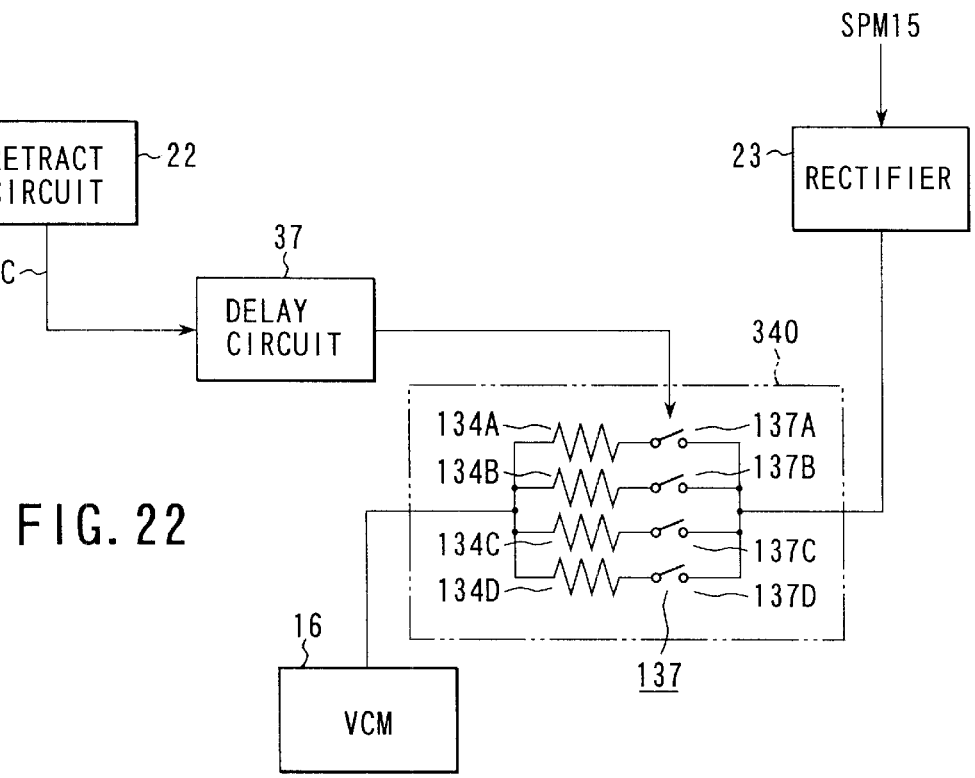
FIG. 22 is a block diagram showing the second modification of the system according to the second embodiment.

FIG. 22 is a block diagram showing the second modification of the system according to the second embodiment.

The system of the second embodiment can set, by the series resistor 17, the current value of a driving current (to be referred to as an unloading current) supplied to the coil of the VCM 16 upon power down. However, once the current value is set, it cannot be changed. As the unloading control system, the current value of the unloading current is desirably selected and set from a plurality of current values.

For this purpose, the system of the second modification comprises a current setting circuit 340 for selecting and setting the current value of the unloading current, as shown in FIG. 22. The current setting circuit 340 corresponds to the series resistor 17 of the second embodiment, and is series-connected between the output of the rectifier 23 and the coil of the VCM 16.

The current setting circuit 340 has a switching circuit 137 in which a plurality of resistors 134A to 134D having different resistance values are parallel-connected to each other and respectively series-connected to switches 137A to 137D. In normal drive operation, the current setting circuit 340 sets in advance any one of the switches 137A to 137D which operates by the retract instruction signal RC in the switching circuit 137. By selecting the switches 137A to 137D, any one of the resistors 134A to 134D is selected and set.

More specifically, when the retract circuit 22 outputs the retract instruction signal RC upon power down, the delay circuit 37 outputs the retract instruction signal RC to the current setting circuit 340 with a delay of a predetermined time. The function of the delay circuit 37 has been described in this embodiment. In the current setting circuit 340, a switch (137A in this case) selected in advance is turned on in accordance with the retract instruction signal RC. The output of the rectifier 23 and the coil of the VCM 16 are connected via the switch 137A and corresponding resistor 134A. Thus, a DC current from the rectifier 23 that is limited by the resistance value of the resistor 134A is supplied to the coil of the VCM 16.

The arrangement of the second modification can select and set the unloading current supplied to the VCM 16 in advance. In this case, it is possible that the stop position X of the head 12 upon power down is determined at several positions on the disk 11, and a necessary VCM current value is measured, and the moving distance of the head 12 in unloading operation is estimated based on the measurement result. To optimize the moving speed of the actuator 13 in accordance with the moving distance, the current setting circuit 340 can select and set a proper unloading current in advance.

Third Modification

Figure 23:
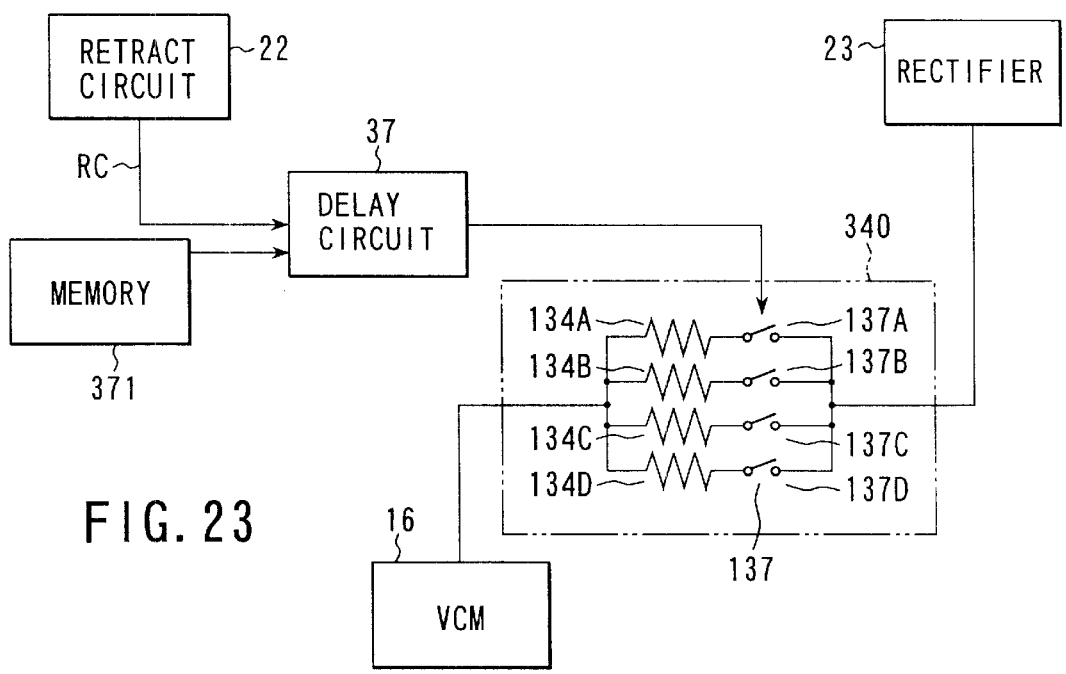
FIG. 23 is a block diagram showing the third modification of the system according to the second embodiment.

FIG. 23 is a block diagram showing the third modification of the system according to the second embodiment.

The third modification is an application of the second modification, and relates to a system having a function of selecting and setting a plurality of current values as the current value of the unloading current, and changing each current value as a function of time.

More specifically, as shown in FIG. 23, this system comprises a memory 371 storing switching time information and selection information for selecting a plurality of switches from the switches 137A to 137D of the current setting circuit 340. Further, the system comprises a delay circuit 370 having a switching function and switching time measurement function (made up of a counter and comparator) based on the respective information of the memory 371.

Unloading operation in the system of the third modification will be explained with reference to FIG. 20 together with FIG. 23.

When the drive is powered down (time T1), the delay circuit 370 turns on any one of the switches 137A to 137D of the current setting circuit 340 upon the lapse of a predetermined time (current suspension time) in accordance with input of the retract instruction signal RC from the retract circuit 22. In this case, a switch (137A in this case) which is turned on in the first step is stored as selection information in the memory 371 in advance.

The switch 137A which is turned on in the first step connects the output of the rectifier 23 and the coil of the VCM 16 via the switch 137A and corresponding resistor 134A. Then, a DC current from the rectifier 23 that is limited by the resistance value of the resistor 134A is supplied to the coil of the VCM 16.

That is, as shown in FIG. 20, e.g., an unloading current having a relatively small current value is supplied to the coil of the VCM 16 in the first step (step CS1) of unloading operation. In the first step, the speed of the actuator 13 is decreased to move the head 12 close to the ramp 14. After that, the delay circuit 370 shifts to step CS2 upon the lapse of a predetermined time from the first step CS1 on the basis of the switching time information stored in the memory 371 in advance.

In step CS2, the delay circuit 370 turns on any one of the switches 137B to 137D of the current setting circuit 340. In this case, a switch (137B in this case) which is turned on in the second step is stored as selection information in the memory 371 in advance. The switch 137B which is turned on in step CS2 connects the output of the rectifier 23 and the coil of the VCM 16 via the switch 137B and corresponding resistor 134B. Then, a DC current from the rectifier 23 that is limited by the resistance value of the resistor 134B is supplied to the coil of the VCM 16.

That is, as shown in FIG. 20, e.g., an unloading current having a relatively large current value is supplied to the coil of the VCM 16 in the second step (step CS2) of unloading operation. Thus, in the second step, the driving force of the actuator 13 is increased to reliably slide the head 12 onto the ramp 14.

This arrangement can change the driving force of the actuator 13 stepwise in retracting the head 12 to the ramp 14 in unloading operation upon power down. For example, to move the head 12 close to the ramp 14, the driving force can be suppressed low because no large driving force is required, and the moving speed of the actuator 13 can be set relatively low because no high speed is required. In addition, to slide the head 12 onto the ramp surface of the ramp 14 against the frictional force, the driving force must be large to a given degree, and a relatively large driving current is set. This realizes unloading operation of reliably retracting the head 12 to the ramp 14 by the optimal moving characteristics (moving speed and moving time) of the actuator 13.

As has been described in detail above, according to the system of each embodiment, when the drive is powered down during operation of a disk storage device of a head loading/unloading type, the head position as an unloading operation start position can be made almost constant. The current value of a driving current supplied to the actuator driving means upon power down can be selected and set within a certain range. The driving force of the actuator can be changed stepwise. As a result, the present invention can realize stable unloading operation capable of preventing damage to the head or disk by optimizing the moving speed of the head.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:

a head for reading/writing data from/on a disk;

a ramp arranged outside the disk to unload the head;

actuator means for supporting the head, and moving the head from the ramp over a predetermined range on a disk surface with a voice coil motor;

reserve power means, arranged separately from a main power supply of said disk drive, for supplying a driving current to said actuator means upon power down of the main power supply;

switching means for switching between a relatively-high-level voltage and low-level voltage from said reserve power means, and supplying the voltage to said actuator means;

determining means for determining that the head comes into contact with the ramp by monitoring a change in voltage over time at a terminal of a coil of the voice coil motor; and control means for controlling said switching means in accordance with a determination result of said determining means upon power down of the main power supply so as to supply the low-level voltage from said reserve power means to said actuator means until the head moves to the ramp, and to supply the high-level voltage from said reserve power means to said actuator means when the head comes into contact with the ramp, wherein said determining means comprises:

a detection circuit for detecting a back electromotive voltage induced by the coil of the voice coil motor included in said actuator means;

a differentiating circuit for differentiating the back electromotive voltage by a time; and a comparison circuit for comparing an output value from said differentiating circuit with a reference value, and when the output value is not less than the reference value, outputting a determination signal representing that the head collides against the ramp.

2. A disk drive comprising:

a head for reading/writing data from/on a disk;

a ramp arranged outside the disk to unload the head;

actuator means for supporting the head, and moving the head from the ramp over a predetermined range on a disk surface with a voice coil motor;

reserve power means, arranged separately from a main power supply of said disk drive, for supplying a driving current to said actuator means upon power down of the main power supply;

switching means for switching between a relatively-high-level voltage and low-level voltage from said reserve power means, and supplying the voltage to said actuator means;

determining means for determining that the head comes into contact with the ramp by monitoring a change in voltage over time at a terminal of a coil of the voice coil motor; and control means for controlling said switching means in accordance with a determination result of said determining means upon power down of the main power supply so as to supply the low-level voltage from said reserve power means to said actuator means until the head moves to the ramp, and to supply the high-level voltage from said reserve power means to said actuator means when the head comes into contact with the ramp, wherein said reserve power means comprises:

a rectifier for rectifying a back electromotive force of a spindle motor for rotating the disk, and generating a relatively-high-level voltage; and a constant voltage circuit for generating a constant voltage having a lower-level voltage value than the voltage level from the output voltage of said rectifier, wherein said constant voltage circuit comprises:

comparison means for comparing a voltage applied to said actuator means with a reference value; and a switching circuit for switching between application of the constant voltage to said actuation and stop of application thereof in accordance with a comparison result of said comparison means.

* * * * *